Aug. 1, 1939.  A. COZZITORTO  2,168,094
SAFETY APPLIANCE FOR AIRPLANES
Filed Jan. 14, 1939   2 Sheets-Sheet 1
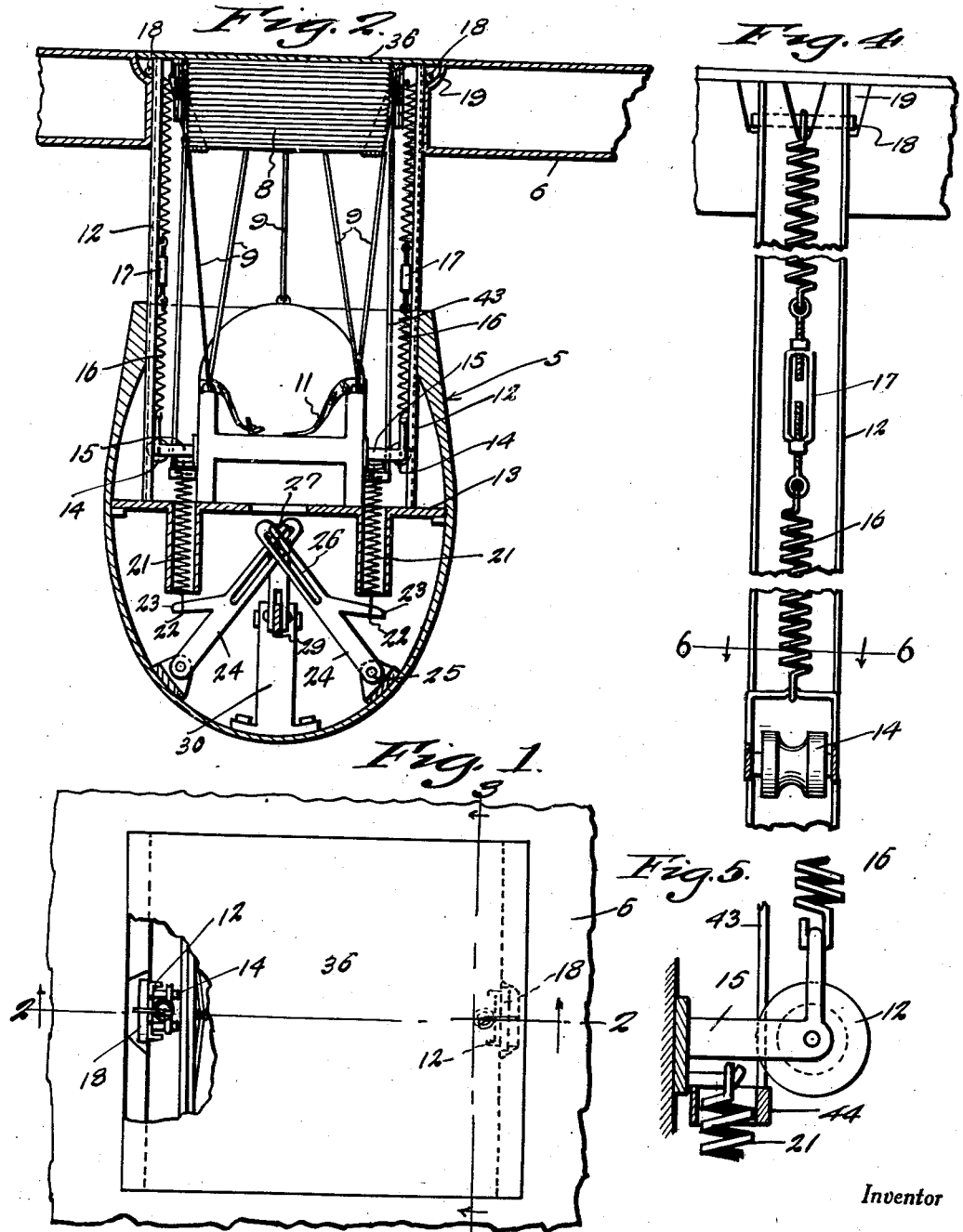
Inventor
Angelo Cozzitorto
By Clarence A. O'Brien
and Hyman Berman
Attorneys Aug. 1, 1939.　　　　A. COZZITORTO　　　　2,168,094
SAFETY APPLIANCE FOR AIRPLANES
Filed Jan. 14, 1939　　　　2 Sheets—Sheet 2
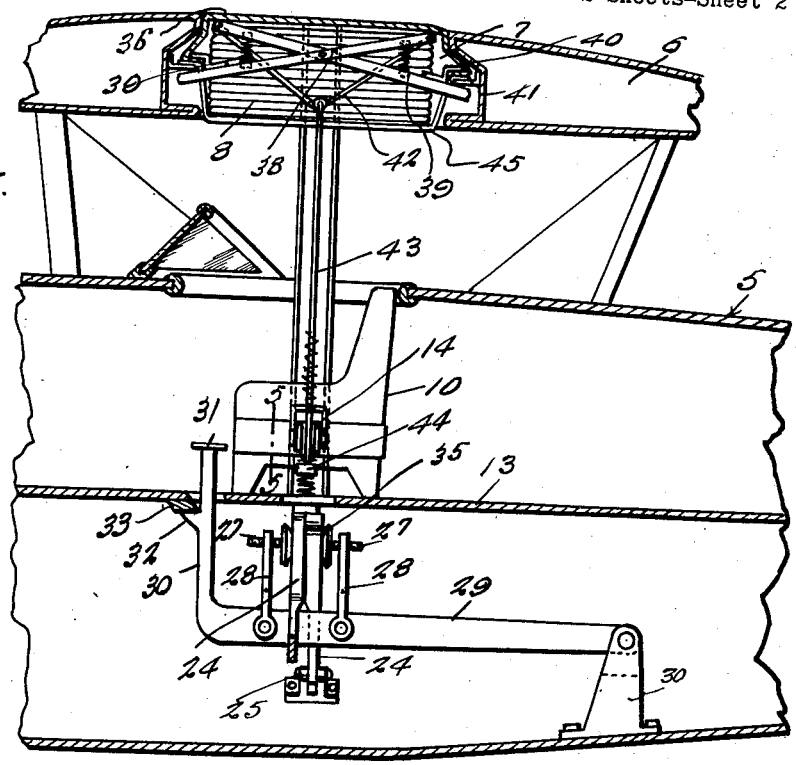
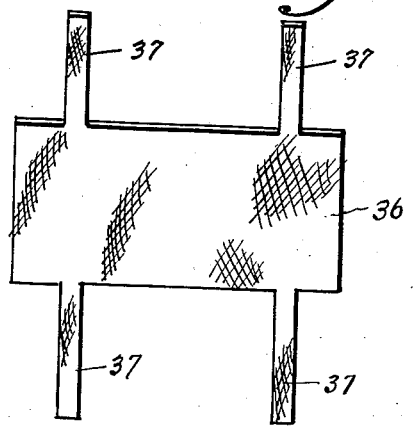
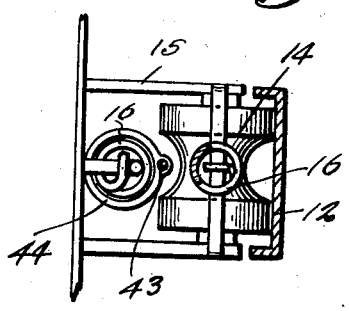
Inventor
Angelo Cozzitorto
By Clarence A. O'Brien
and Hyman Berman
Attorneys Patented Aug. 1, 1939

2,168,094

UNITED STATES PATENT OFFICE 2,168,094

SAFETY APPLIANCE FOR AIRPLANES

Angelo Cozzitorto, Fresno, Calif.

Application January 14, 1939, Serial No. 251,024

2 Claims. (Cl. 244—141)

This invention relates to a safety appliance for airplanes, and has for the primary object the provision of a device of this character which may be easily and quickly released in case of an emergency while an airplane is in flight to safely land the occupant and which is in the form of a parachute and a chair so mounted in the airplane with a manually releasable elevating means whereby the occupant of the chair may release the parachute and the chair and be lifted clear of the airplane and gradually lowered to the ground with safety.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a fragmentary top plan view, partly broken away, showing a portion of an airplane wing with a storage compartment for the accommodation of a folded parachute.

Figure 2 is a fragmentary transverse sectional view taken on the line 2—2 of Figure 1.

Figure 3 is a sectional view taken on the line 3—3 of Figure 1.

Figure 4 is a fragmentary sectional view illustrating one of the tracks and one of the spring elevating devices.

Figure 5 is a detail sectional view taken on the line 5—5 of Figure 3.

Figure 6 is a detail sectional view taken on the line 6—6 of Figure 4.

Figure 7 is a perspective view illustrating a connecting element.

Figure 8 is a bottom plan view illustrating a cover.

Referring in detail to the drawings, the numeral 5 indicates a portion of a fuselage of an airplane and 6 a portion of the wing of the airplane. The wing 6 in the present illustration is shown as extending across the fuselage and the latter is of the open cockpit type. The wing 6 directly above the cockpit is provided with an opening 7 aligning with the cockpit in which is arranged a folded parachute 8, the cords or leaders 9 thereof extend downwardly into the cockpit of the fuselage and are connected to a chair 10 provided for the occupant of the airplane and which is provided with the usual safety straps or belts 11 for fastening the occupant in the chair.

Vertically arranged tracks 12 of channel construction extend from the floor 13 of the fuselage into the opening 7 of the wing and are suitably secured to the latter and arranged in opposed relation and slidably support rollers 14 journaled in brackets 15 fastened on opposite sides of the chair 10 and to which are connected elevating springs 16 of the coil type each including a pair of springs connected by turn buckles 17. The upper ends of the springs 16 are connected to rods 18 lying in recesses 19 formed in the wings, the upper ends of the tracks 12 being notched, as shown at 20, to allow the springs to extend through said tracks into the recesses.

Restraining coil springs 21 are secured to the brackets 15 and are provided with eyes 22 on their lower ends to engage over extensions 23 formed on pivotally mounted arms 24. The arms 24 are pivotally mounted on brackets 25 mounted on the lower wall of the fuselage below the floor and are arranged in overlapping relation and are provided with slots 26 through which extends a rod 27 provided with screw threads and engaged by connecting links 28 pivoted on a trip lever 29. The trip lever 29 is pivotally mounted on a bracket 30 mounted on the bottom wall of the fuselage at one end while a portion thereof is bent angularly to form a shank extending through the floor 13 of the fuselage and terminating in a foot pedal 31. A lug 32 is formed on the shank 30 to engage a projection 33 on the floor 13 for limiting the pivotal movement of the trip lever 29 under the influence of the spring 21, the latter being disposed substantially in vertical alignment with the pivot of the arms 24.

Adjusting nuts 35 are threaded on the rod 27 and against the arms 24 to retain said arms in proper relation to each other on the rod 27.

A substantially rigid cover 36 overlies the folded parachute for closing the opening on the top surface of the wing to prevent wind from interfering with the folded parachute during the flight of the airplane and is provided with a series of straps 37 which extend downwardly in the opening. Pairs of release members 38 are arranged in the opening and the members of each pair cross each other and are pivotally connected and have connected thereto expansion springs 39 so that one end of each member bears against the cover while each member is equipped with a hook-shaped bracket 40 to engage with brackets 41 mounted in the opening 7. The straps are brought between the brackets 40 and 41 to retain the cover in position. Flexible elements 42 are connected to the cover and to rods 43 which extend into the cockpit and terminate in eyes 44. The eyes 44 encircle the springs 21 below the bracket 15 so that the restraining springs 21 when tensioned act to restrain the action of the spring 39 and thereby maintain the release members 38 crossed, as shown in Figure 3, with the brackets 40 thereof in engagement with the brackets 41 and also in engagement with the cover. The straps 45 pass under the folded parachute and have the ends thereof positioned between the brackets 40 and 41.

In case of a forced landing or an emergency, the person occupying the chair 10 steps on the foot pedal 31 causing a pivotal movement of the arms 24 freeing the extensions 23 from the restraining springs 21. The springs 39 immediatey expand, which brings about pivotal movement of the releasing members 38. The releasing members 38 elevate the cover and at the same time free the straps 37 and 45 so that the wind may catch the parachute and draw the same outwardly of the opening 7 and thereby bring about opening of the parachute. As the restraining springs 21 are released the elevating springs 16 elevate the chair bringing the occupant of the chair toward the opening and as the parachute opens the chair and the occupant are drawn through the opening and free of the airplane to be lowered by the parachute with safety.

It is believed that the foregoing description, when taken in connection with the drawings will fully set forth the construction and advantages of this invention to those skilled in the art to which such a device relates, so that further detailed description will not be required.

What I claim is:

1. In combination with an airplane including a cockpit and a wing having an opening, a folded parachute located in the opening, tracks extending from the opening into the cockpit, a chair slidable on said tracks and connected to the parachute, elevating springs connected to the chair and releasably secured to the wing, a cover for the parachute, means releasably securing the cover to the wing, restraining springs connected to said chair and to the first means, and manually operated means in the cockpit to releasably secure said restraining springs to the airplane.

2. In combination with an airplane including a cockpit and a wing having an opening, a folded parachute located in the opening, tracks extending from the opening into the cockpit, a chair slidable on said tracks and connected to the parachute, elevating springs connected to the chair and releasably secured to the wing, a cover for the parachute, spring influenced members releasably securing the cover on the parachute and retaining the latter in the opening, restraining springs connected to the chair, means connecting the restraining springs to said spring influenced releasing members, arms pivotally mounted in the airplane and having overlapping relation and provided with slots, extensions on said arms and having the restraining springs detachably connected thereto, a rod extending through the slots, and a releasing lever connected to said rod.

ANGELO COZZITORTO.